United States Patent [19]

Shimomae

[11] 4,399,475
[45] Aug. 16, 1983

[54] TAPE RECORDER

[75] Inventor: Katsuro Shimomae, Higashikurume, Japan

[73] Assignee: Trio Kabushiki Kaisha, Toyko, Japan

[21] Appl. No.: 252,854

[22] Filed: Apr. 10, 1981

[30] Foreign Application Priority Data

Apr. 14, 1980 [JP] Japan .................................. 55-48989
Apr. 14, 1980 [JP] Japan .................................. 55-48990
Apr. 14, 1980 [JP] Japan .................................. 55-48991
Apr. 14, 1980 [JP] Japan .................................. 55-48992
Nov. 26, 1980 [JP] Japan ................................ 55-166336

[51] Int. Cl.³ ............................................ G11B 5/54
[52] U.S. Cl. .................................... 360/96.3; 360/105
[58] Field of Search .................... 360/96.1, 96.3, 96.4, 360/71, 69, 105, 90; 242/197-200

[56] References Cited

U.S. PATENT DOCUMENTS

| 4,152,738 | 5/1979 | Shimizu et al. | 360/96.1 X |
| 4,212,040 | 7/1980 | Yoshida et al. | 360/96.3 |
| 4,219,852 | 8/1980 | Magata et al. | 360/105 X |
| 4,330,805 | 5/1982 | Osanai | 360/96.1 X |

FOREIGN PATENT DOCUMENTS 54-9541 6/1979 Japan .

*Primary Examiner*—John H. Wolff
*Attorney, Agent, or Firm*—Dann, Dorfman, Herrell and Skillman

[57] ABSTRACT

A tape drive mechanism for a tape recorder is provided with a motor-driven drive gear. The tape drive mechanism includes first and second switch gears engageable with the drive gear for respectively switching the tape drive mechanism into a first and second mode of operation. First and second cam arrangements respectively convert the rotation of the first and second switch gears into a displacement of the magnetic head of the tape recorder relative to the magnetic tape. The drive gear when switched to the first mode displaces the magnetic head by the first cam arrangement, and when switched to the second mode displaces the magnetic head by the second cam arrangement. The first and second switch gears are each provided with a toothless portion for disengaging the drive gear in the first and second modes of operation respectively. First and second trigger mechanisms respectively retain the first and second switch gears in position in the first and second modes and also function to switch the tape drive mechanism into additional modes of operation.

20 Claims, 12 Drawing Figures

TAPE RECORDER

BACKGROUND OF THE INVENTION

This invention relates to cassette tape recorder mechanisms, and more particularly to a cassette tape recorder which employs simplified component parts in various operational mechanisms and which is improved in performance quality with regard to "cue" and "review" operations in addition to "play", "fast-forward" and "rewind" operations for the feed and take-up reels of the tape cassettes.

In most cases, a single motor type mechanism is employed in the conventional cassette tape recorders, shifting the operating mechanism into "play", "fast-forward" and "rewind" positions by the use of the inertia force of a flywheel or electrically by means of larger plunger solenoids. Therefore, the mechanism intended for these operations are invariably complicated and involve a great number of levers or similar parts, resulting in inferior performance quality and high production costs particularly in the case of plunger-direct systems.

Besides, conventional trigger mechanisms have a drawback in that they are low in operational responsiveness and a delay of action is often experiences when changing the mode of operation from one function to another. Furthermore, it has been the general practice to hold the outer periphery of an idler constantly in pressed engagement with a power transmitting drive pulley and one of the feed or take-up reel stands for the tape. This has given rise to the problem that a frictional material like rubber which is applied around the outer periphery of the idler is very susceptible to deformation and abrasive wear.

The present invention aims at the elimination of the above-mentioned drawbacks of the conventional mechanisms, by providing a cassette tape recorder which employs simplified component parts therefor, which is simplified in performance quality of various cassette operating mechanisms and which is low in cost and easy to assemble. Furthermore, an arrangement is adopted wherein the idler interposed between the drive motor pulley and the feed or take-up reel is put into and out of pressed engagement therewith in relation with the operation of a brake arm for the feed and take-up reels to maintain the pressed engagement only in corresponding modes of operation.

SUMMARY OF THE INVENTION

The present invention provides a tape drive mechanism in a tape recording/reproducing apparatus having a magnetic head and means for receiving a magnetic tape. The tape drive mechanism includes a rotatable capstan for advancing the magnetic tape at a predetermined linear speed, a drive gear, and means for driving the capstan and the drive gear. The tape drive mechanism also includes a first rotatable switch gear engageable with the drive gear for switching the tape drive mechanism into a position for at least a first mode of operation. Means are provided for converting the rotation of the first switch gear into a displacement of the magnetic head. Means are also provided for disengaging the drive gear and the switch gear in the first mode position of operation, the drive gear only being engaged with the first switch gear when the operation is switched to the first mode in order to shift the magnetic head relative to the tape to a position corresponding to the first mode of operation. Means are provided for retaining the first switch gear in position for the first mode of operation. The tape drive mechanism also includes a second rotatable switch gear which is engageable with the drive gear for switching the tape drive mechanism into a position for at least a second mode of operation other than the first mode. Means is provided for converting the rotation of the second switch gear into a displacement of the magnetic head. The tape drive mechanism also includes means for disengaging the drive gear and the second switch gear in the second mode position of operation, the drive gear only being engaged with the second switch gear when the operation is switched to the second mode in order to shift the magnetic head relative to the tape to a position corresponding to the second mode of operation. Means are provided for retaining the second switch gear in position for the second mode of operation.

In the particular embodiment where the tape recording/reproducing apparatus is a cassette tape recorder of the type which has a magnetic tape head and utilizes rotational force from a motor-driven flywheel for shifting a tape drive mechanism into desired modes of operation, the recorder includes a driven capstan gear which is provided coaxially with the motor-driven flywheel. The recorder also includes first and second partly toothless trigger gears respectively engageable with said capstan gear. Biasing springs are connected to and adapted to respectively rotate the first and second partly toothless trigger gears in one direction upon the respective disengagement of the first and second partly toothless trigger gears from the capstan gear at the toothless portions thereof. First and second fully toothed trigger gears are coaxially mounted on the first and second partly toothless trigger gears, respectively, to form respective first and second trigger gear units. First and second cam gears are provided which respectively engage the first and second fully toothed trigger gears. A tape-feed reel stand and a tape take-up reel stand are provided for the cassette tape with brake pads engageably abutting the stands. A first cam means communicates with the first cam gear for moving the brake pads out of abutting engagement with the tape reel stand. A second cam means is also provided which communicates with the second cam gear for alternatively moving the brake pads out of abutting engagement with the tape reel stands. The recorder also includes first and second trigger levers. Stoppers are provided on the respective trigger gear units and are respectively engageable with the fore ends of the first and second trigger levers for respectively stopping the first and second cam gears upon their respective rotation at the toothless portions of the first and second partly toothless trigger gears in order to selectively position the cam means to hold the brake pads in positions in or out of abutting engagement with the tape feed and tape take-up reel stands.

The tape recorder in accordance with this embodiment also includes a bifurcated brake arm with the brake pads being attached to the fore ends thereof. Resilient means is provided to force the brake arm to press the brake pads against the feed and take-up reel stands. The brake arm is supported on a brake releasing plate which is movable by alternative engagement with the first and second cam means so as to release the brake pads from the tape reel stands. The recorder also includes a reversably rotatable drive motor pulley and a rocking idler support plate pivotally supported on the brake releasing plate. An idler is journalled in the rocking idler support plate which is simultaneously movable with the brake releasing plate which causes the idler to be pressed against the drive motor pulley in order to impart the forward or reverse rotation of the drive motor pulley to the idler. The engagement of the idler with the rotating drive motor pulley causes the rocking idler support plate to pivot such that the idler is moved into pressed engagement with the feed or take-up reel stands so as to impart rotational movement thereto.

BRIEF DESCRIPTION OF THE DRAWINGS

In order to more completely understand the apparatus in accordance with the present invention, major component parts of a conventional prior art operating mechanism and a preferred embodiment of the present invention are illustrated by the appended drawings in which.

DESCRIPTION OF THE PREFERRED EMBODIMENT

Figure 1:
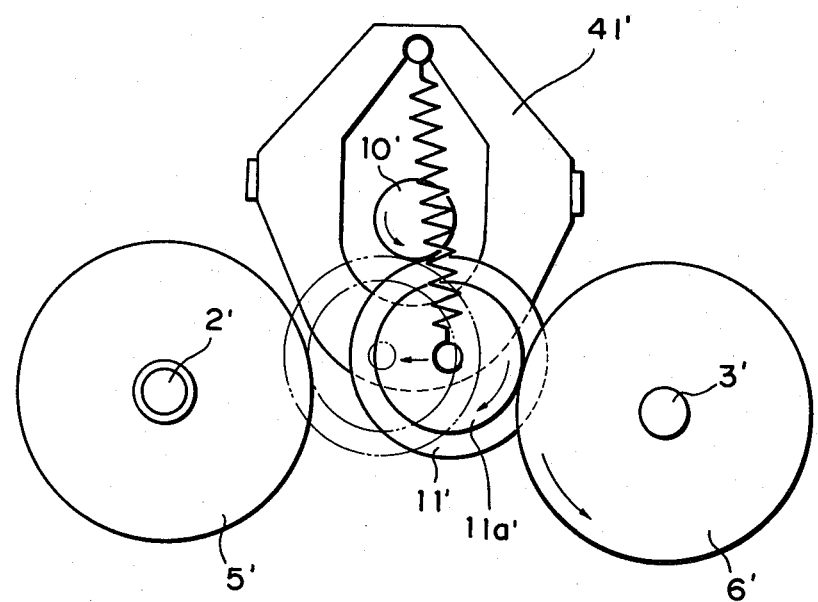
FIG. 1 is a front elevational view of major component parts of a conventional prior art operating mechanism.

Referring to FIG. 1, some of the major component parts of a prior art conventional operating mechanism are illustrated. In transmitting power from a drive motor pulley 10' to a feed reel shaft 2' or a take-up reel shaft 3' through an idler 11', it has been the general practice to hold the outer periphery of the idler constantly in pressed engagement with the drive motor pulley 10' and one of feed and take-up reel stands 5' and 6', giving rise to a problem that a friction material like rubber which is applied around the outer periphery of the idler 11' is very susceptible to deformations and abrasive wears.

Figure 2:
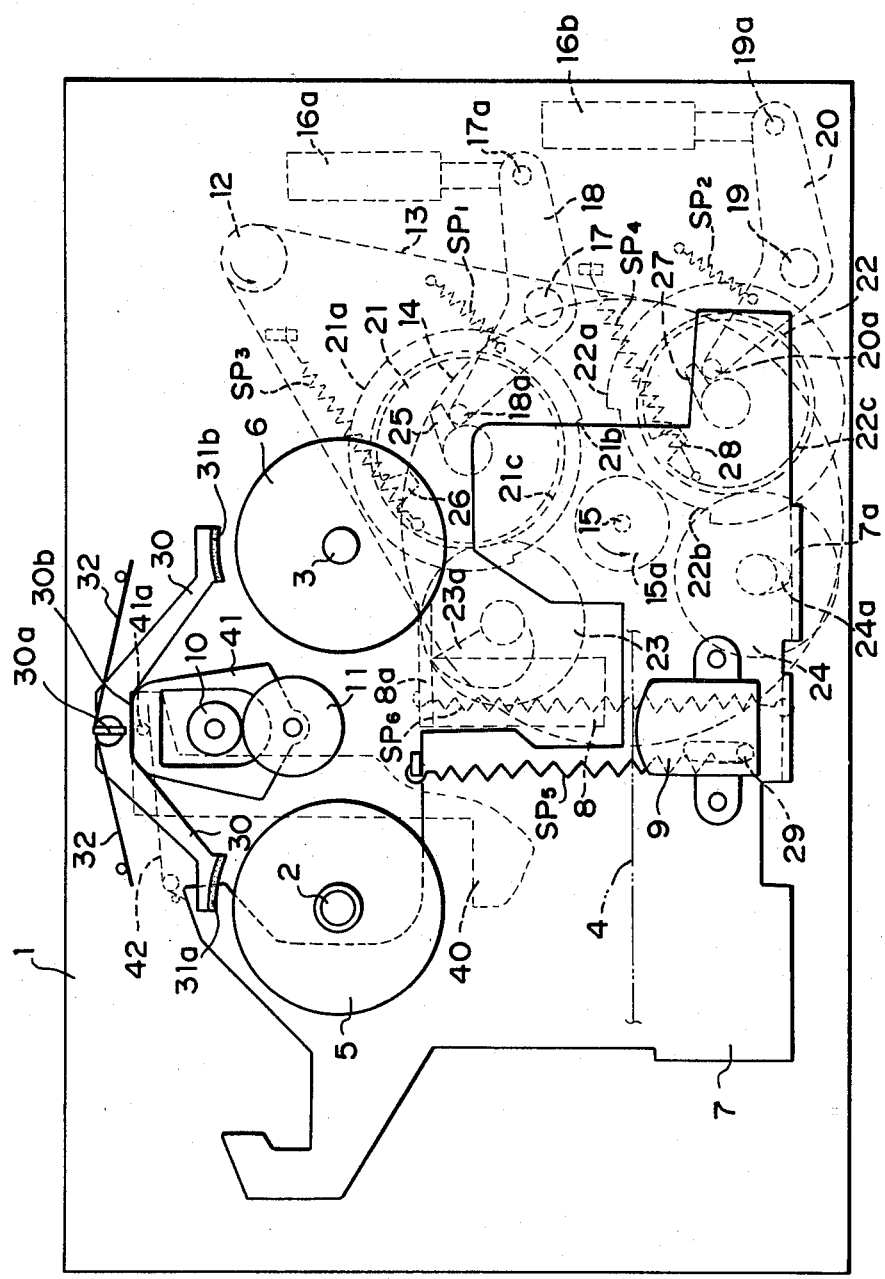
FIG. 2 is a cut-away front elevational view of a preferred embodiment of the tape drive mechanism in a tape recording/reproducing apparatus in accordance with the present invention.
Figure 3:
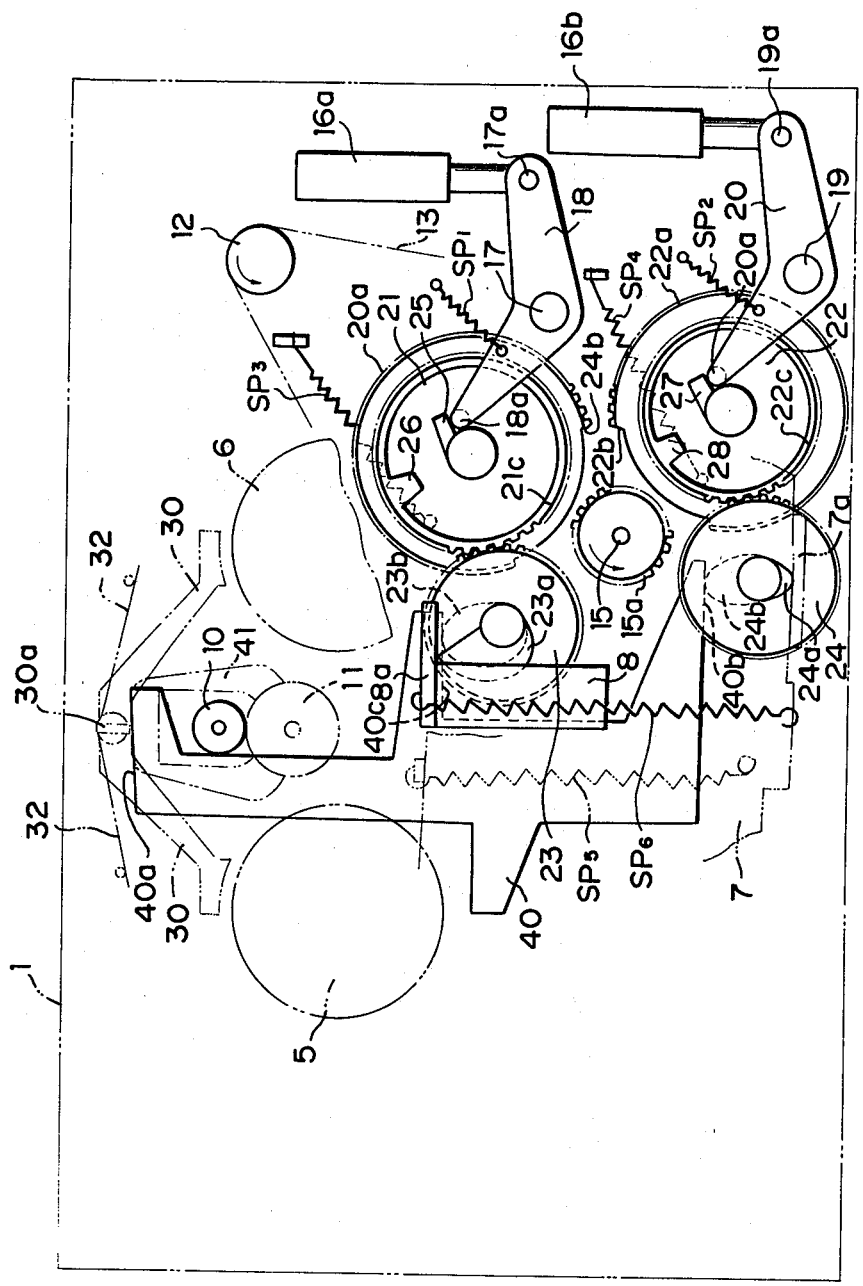
FIG. 3 is a front elevational view of the interior of the preferred embodiment made in accordance with the present invention, as viewed after removing the chassis and all parts located on the chassis toward the viewer's side.

A preferred embodiment of the present invention is hereafter described more particularly with reference to FIGS. 2 through 7 of the accompanying drawings. Referring to FIG. 2, there is shown an embodiment of the invention in a diagrammatic front view, in which indicated at 1 is a chassis of the tape recorder, at 2 a feed reel shaft, at 3 a take-up reel shaft, at 4 a cassette tape, at 5 a feed reel stand, at 6 a take-up reel stand, at 7 a head base which is mounted on the chassis 1, and at 8 a head base damp plate which is movable relative to the head base 7 and formed with a cam block or cam follower 8a. The reference numeral 9 denotes a magnetic head such as a magnetic recording/reproducing head which is fixedly mounted on the head base 7 and slidable integrally therewith up and down, as seen in FIG. 2, under the guidance of a slot which is in engagement with a pin 29 planted on the chassis 1. A reel drive motor pulley 10 transmits rotation to the feed reel shaft 2 or take-up reel shaft 4 when the idler 11 is selectively pressed against either the feed reel stand 5 or the take-up reel stand 6. Designated at 12 is a capstan motor pulley of a driving means such as a capstan drive motor, which rotatably drives, through a belt 1, a flywheel 14 which is provided integrally with a rotatable capstan shaft 15 such that the capstan transports the tape at a pre-determined linear speed. The capstan shaft 15 has a capstan or drive gear 15a which is rotatable integrally therewith. A couple of plungers 16a and 16b which are mounted on the tape recorder chassis 1 are pivotally connected at 17a and 19b to a first train (hereinafter "FD") FD trigger lever 18 and a second train (hereinafter "FR") FR trigger lever 20, respectively, which are pivotable or rockable up and down about pivot pins 17 and 19. Alternatively, the FD and FR trigger levers may be operated manually. Indicated at 21 is an FD trigger or switch gear unit consisting of a first FD trigger gear 21a and a fully toothed second FD trigger gear 21c which is provided integrally with the first FD trigger gear 21a. FR trigger or switch gear unit 22 consists of a first FR trigger gear 22a and a fully toothed, second FR trigger gear 22c which is integral with the former. The FD trigger gear unit 21 is constantly meshed with an FD cam gear 23 which has the same number of teeth as the second FD trigger gear 21c, while the FR trigger gear unit 22 is constantly meshed with an FR cam gear 24 which has the same number of teeth as the second FR trigger gear 22c.

A cam 23a which is integrally fixed on the FD cam gear 23 is brought into abutting engagement with the cam block 8a of the head base damp plate 8 as the FD cam gear 23 is rotated by the FD trigger gear unit 21, lifting up the head base damp plate 8. On the other hand, a cam 24a which is integrally fixed on the FR cam gear 24 is brought into abutting engagement with a riser wall or cam follower 7a of the head base 7 when the FR cam gear 24 is rotated by the FR trigger gear unit 22, lowering the head base 7 on which the magnetic head 9 is fixedly mounted.

The FD trigger lever 18 and FR trigger lever 20 are biased in clockwise direction respectively by springs $SP_1$ and $SP_2$. In this instance, the FD trigger gear unit 21 is blocked against rotation by the abutting engagement of the fore end 18a of the FD trigger lever 18 with a cam or cam-like stopper 25 which is projectingly provided on the rotational shaft of the gear, and the first FD trigger gear 21a in meshed engagement with the capstan gear 15a is provided with an arcuate void or toothless portion 21b at which rotation of the capstan gear 15a is not transmitted thereto. The FD trigger gear unit 21 is provided on its circumference with a stopper 26 in a predetermined positional relation with the cam 25 on its rotational shaft and biased by a spring $SP_3$ in a clockwise direction in FIG. 2. The FR trigger gear unit 22 is blocked against rotation by abutting engagement of the fore end 20a of the FR trigger lever 20 with cam or cam-like stopper 27 which is projectingly provided on the rotational shaft of the FR trigger gear unit 22, and the first FR trigger gear 22a in meshed engagement with the capstan gear 15a on the capstan shaft 15 is provided with a void an arcuate void or toothless portion 22b at which rotation of the capstan gear 15a is not transmitted thereto. The FR trigger gear unit 22 is provided on its circumference with a stopper 28 in a predetermined positional relation with the cam or cam-like stopper 27 on its rotational shaft, and biased by a spring $SP_4$ in clockwise direction in FIG. 2.

Designated at $SP_5$ is a spring tensioned between a pin 29 which is projected on the surface of the tape recorder chassis 1 and the heat base 7 which is located in a predetermined position relative to the pin 29, biasing the magnetic head 9 and heat base 7 integrally downward in FIG. 2. Tensioned between the head base 7 and the head base damp plate 8 is a spring $SP_6$ which pulls up the head base 7 against the action of the spring $SP_5$ to move the magnetic head 9 smoothly along the slot when the head base damp plate 8 is lifted up by the cam 23a of the FD cam gear 23.

With regard to depthwise relative positions, the capstan drive motor 12, FD trigger gear unit 21, FR trigger gear unit 22, FD cam gear 23, FR cam gear 24 and capstan gear 15a are located on the back side of the tape recorder chassis 1, along with the FD trigger lever 18 and FR trigger lever 20. The flywheel 14 is fixed on the capstan shaft 15 in a rearmost position. Mounted on the front side of the tape recorder chassis 1 are the head base 7, head base damp plate 8, a pinch roller and the like, the head base 7 securely supporting the magnetic head 9 on the front side thereof. The tape cassette 4 has feed and take-up reels with hubs to be fitted respectively on the supply and take-up reel shafts 3 and 3 which are projected on the front side of the chassis 1.

Turning now to a brake mechanism denoted at 30 for preventing the slackening or entangling troubles of the tape due to inertia force of the feed or take-up reel, is a bifurcated brake arm 30 which applies a braking force on the rotating reel stands 5 and 6 in response to a predetermined instruction. The brake arm 30 has brake pads 31a and 31b secured to the respective braking faces thereof. A return spring 32 is engaged with a center portion 30a of the bifurcated brake arm 30, constantly pressing the brake pads against the reel beds 5 and 6. The reference numeral 41 denotes an idler support plate substantially of an annular shape, which has the idler 11 journalled in its lower portion and the drive motor pulley 10 located in a window or opening in its center portion. The support plate is provided in its upper portion with a pin 41a in engagement with a press spring 42 which is weaker than the afore-mentioned return spring 32, pushing up the idler support plate 41 to press the idler 11 against the drive motor pulley 10. The idler support plate 41 is slidable up and down relative to the chassis 1 and at the same time rockable about the pin 41a.

Figure 6:
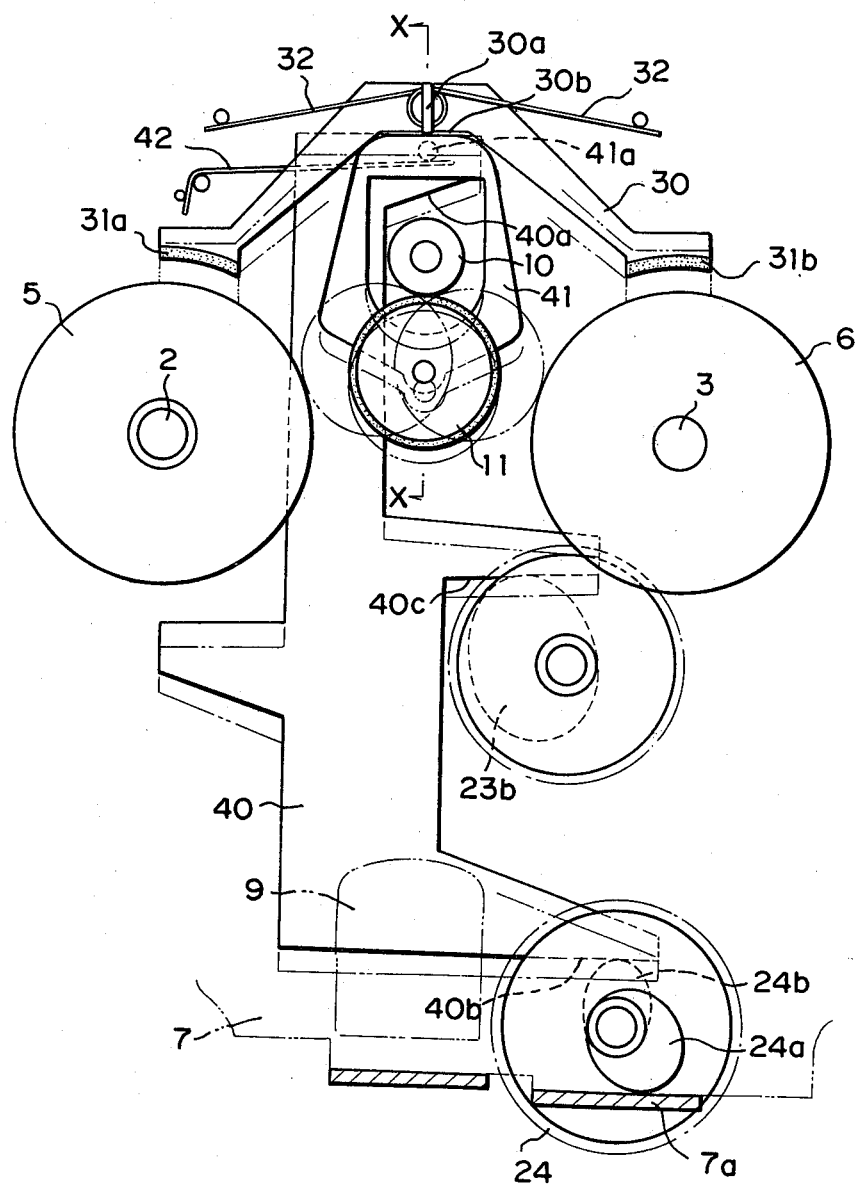
FIG. 6 is a diagrammatic view of the braking mechanism in accordance with a preferred embodiment of the present invention.

The pin 30a of the brake arm 30, which is projected on the rear side of the chassis 1, is engaged with an upper pawl or protruding element 40a of a brake releasing plate 40 of substantially E-shape which is vertically slidably mounted on the chassis 1, as illustrated in FIG. 6. In order to release the brake, the brake releasing plate 40 which is in engagement with the brake arm 30 is pushed up against the action of the return spring 32 by cam 24b or cam 23b. The cam 24b is in engagement with a lower pawl or cam follower 40b and located on the opposite side with respect to and with a 180° phase differential from the cam 24a and the cam 23b of the FD cam gear 23 in engagement with a middle pawl or cam follower 40c and located on the opposite side with respect to and with a 180° phase differential from the cam 23a. Whereupon, the idler support plate 41 which is urged downward by the return spring 32 of the brake releasing plate 40 is released therefrom and pushed upward by the press spring 42, pressing the idler 11 against the drivemotor pulley 10 for rotation therewith. More particularly, when the drive motor pulley 10 is in counterclockwise reverse rotation, the idler 11 is put in clockwise forward rotation and rocked rightward in FIG. 2 and pressed against the take-up reel stand 6, rotating the take-up reel counterclockwise to wind up the tape thereon. On the other hand, when the drive motor pulley 10 is in clockwise forward rotation, the idler 11 is rotated in reverse direction and rocked leftward in FIG. 2 into pressed engagement with the feed reel stand 5, rotating the feed reel in forward direction to rewind the tape thereon. When the brake releasing plate 40 is lowered to apply the brakes, the brake arm 30 is pushed downwardly by the action of the return spring 32. Whereupon, a fork 30b of the brake arm 30 pushes down the idler support plate 41 against the action of the press spring 42 to disengage the idler 11 from the drive motor pulley 10.

Figure 4A:
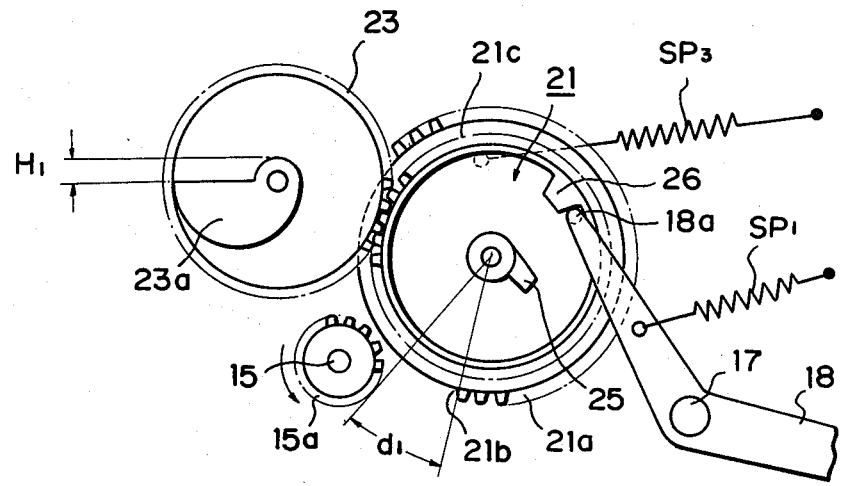
FIGS. 4A to 4D are diagrammatic views of the magnetic head shift mechanism in accordance with a preferred embodiment of the present invention.
Figure 4B:
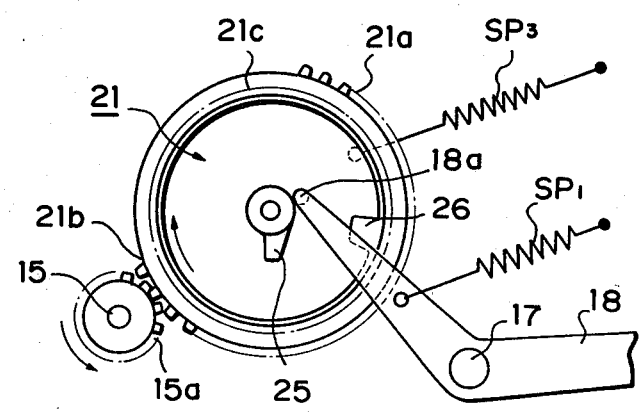
Figure 4C:
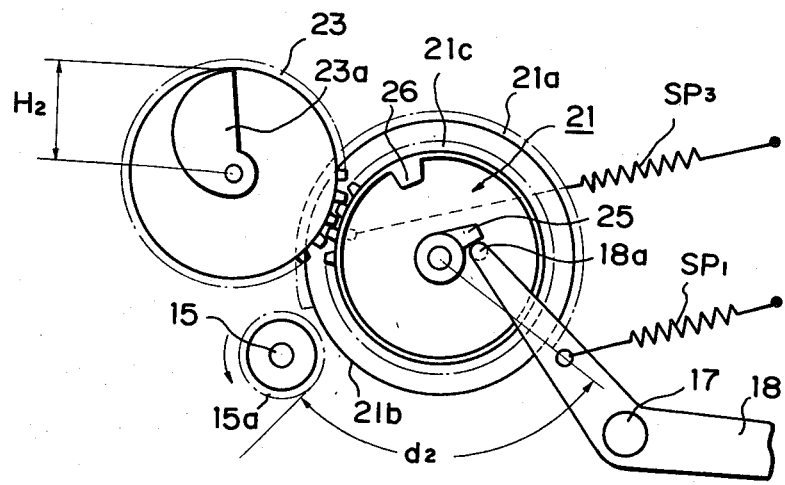
Figure 4D:
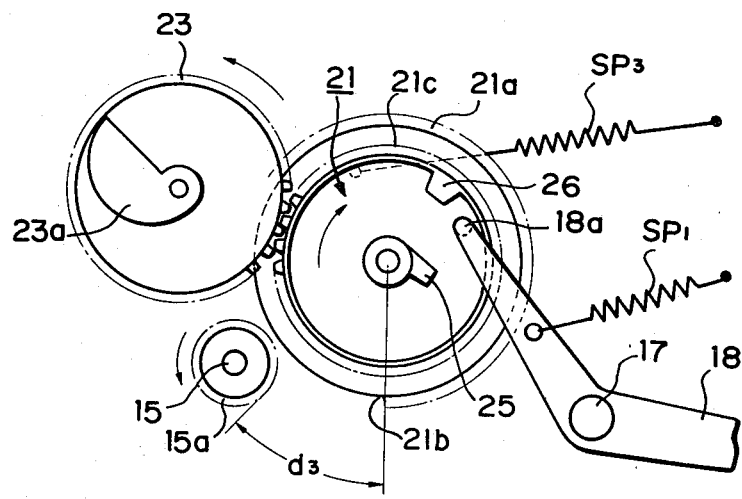
Figure 5A:
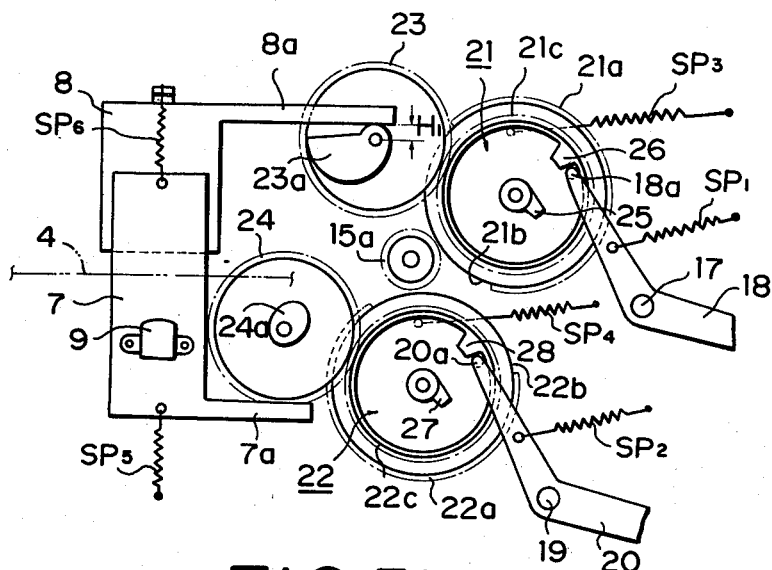
FIGS. 5A to 5C are diagrammatic views of a cue and review operation drive mechanism in accordance with a preferred embodiment of the present invention.

The above-described basic construction is associated with a trigger mechanism which, after loading a tape cassette on the tape recorder, displaces the magnetic head 9 to a position for "play" mode by the inertia of rotational motion of the flywheel 14 which is imparted by rotation of the capstan drive motor 12. FIGS. 4a and 4d illustrate positional relations of various moving parts in basic operations. In a reset state of FIG. 4a, the FD trigger lever 18 which has been released from the pressure of the plunger 16a is rocked clockwise about the pivotal point 17 by the action of the spring $SP_1$, so that the fore end 18a of the FD trigger lever 18 is disengaged from the cam 25. As a result, the FD trigger gear unit 21 is quickly rotated by the spring $SP_3$ until the stopper 26 is abutted against the fore end 18a of the FD trigger lever 18. At this time, the void portion 21b of the first FD trigger gear unit 21 and the capstan gear 15 are not in meshed engagement with each other and are spaced from each other by an angular gap $d_1$. Consequently, the FD cam gear 23 which is constantly meshed with the second FD trigger gear 21c is rotated counterclockwise through an angle corresponding to the angle of rotation of the FD trigger gear unit 21. Since the cam 23a is in a position distant from the cam block 8a of the head base damp plate 8, an upward shift of the magnetic head 9 does not take place. The end face of the cam 23a is positioned at a vertical distance of $H_1$ from the center of the FD cam gear 23. FIG. 4b illustrates a position which is assumed when a "play" signal is imposed in the reset state. Namely, as the FD trigger lever 18 is rotated counterclockwise by the plunger 16a, its fore end 18a is disengaged from the stopper 26 and the FD trigger gear unit 21 is rotated by the action of the spring $SP_3$ and brought into meshing engagement with the capstan gear 15a. Therefore, the FD trigger gear unit 21 and the FD cam gear 23 are rotated by the rotational force of the flywheel 14 and, when rotated to the position of FIG. 4c, the capstan geaer 15a is disengaged at the void portion 21b of the first FD trigger gear 21a and quickly turned by the spring $SP_3$ until the cam 25 is abutted against the fore end portion 18a of the FD trigger lever 18. Now, the capstan gear 15a and the void portion 21b are spaced from each other by an angular gap $d_2$, and the end face of the cam 23a of the FD cam gear 23 which has been rotated by the meshed engagement with the second FD trigger gear 21c comes to a point at a vertical distance $H_2$ ($H_1 < < H_2$) from the center of the FD cam bear 23, pushing up the cam block 8a of the head base damp plate 8. By this movement of the head base damp plate 8, the head base 7 with the magnetic head 9 is also pushed up, abutting the magnetic head 9 against a predetermined position of the cassette tape to maintain the state for the play mode. FIG. 4d illustrates a position in which the play mode has been cancelled, namely, in which the FD trigger lever 18 is rocked clockwise to disengage its fore end portion 18a from the cam 25, permitting the FD cam gear 23 to be rotated by the tensile force of the spring $SP_3$ and the spring $SP_5$ connected to the pin 29. As a result, the FD trigger gear unit 21 is quickly turned until the stopper 26 is abutted against the fore end portion 18a of the FD trigger lever 18. In this instance, the FD cam gear 23 which is in meshed engagement with the second FD trigger gear 21c is also turned, and the cam 23a being disengaged from the cam block 8a of the head base damp plate 8. Therefore, the head base 7 and head base damp plate 8 which is connected to the head base 7 with the spring $SP_6$ are pushed back by the springs $SP_5$ to resume the reset state, namely, the position of FIG. 4a. FIGS. 5a and 5c illustrate the principles of intermediate motions of the trigger mechanism for "cue", "review" and "pause" operations in the play position. The springs $SP_5$ and $SP_6$ are illustrated rather schematically in FIGS. 5a through 5c. They are hooked at positions different from the springs $SP_5$ and $SP_6$ shown in FIGS. 2 and 3. FIG. 5a shows the respective component parts in reset position same as in FIG. 4a. Upon imposition of a "play" signal, the plunger 16a is actuated to turn the FD trigger lever 18 counterclockwise, disengaging the fore end 18a of the FD trigger lever 18 from the stopper 26. As a result, the FD trigger gear unit 21 is quickly turned by the spring $SP_3$ into meshing engagement with the capstan gear 15a. The FD trigger gear unit 21 and FD cam gear 23 are thus rotated by the rotational force of the flywheel 14 until the fore end 18a of the FD trigger lever 18 is abutted against the cam 25. At this time, the capstan gear 15a comes out of meshing engagement with the first FD trigger gear 21a at the void portion 21b thereof, and the cam 23a of the FD cam gear 23 which has been rotated by meshing engagement with the second FD trigger gear 21c pushes up the cam block 8a of the head base damp plate 8. By this movement of the head base damp plate 8, the head base 7 with the magnetic head 9 is also pushed up to maintain the "play" mode position as shown in FIG. 5b.

Figure 5B:
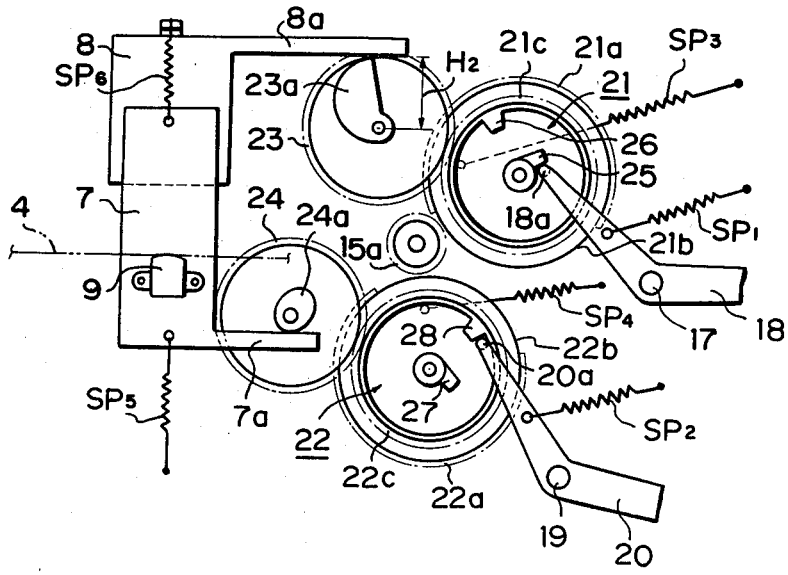
Figure 5C:
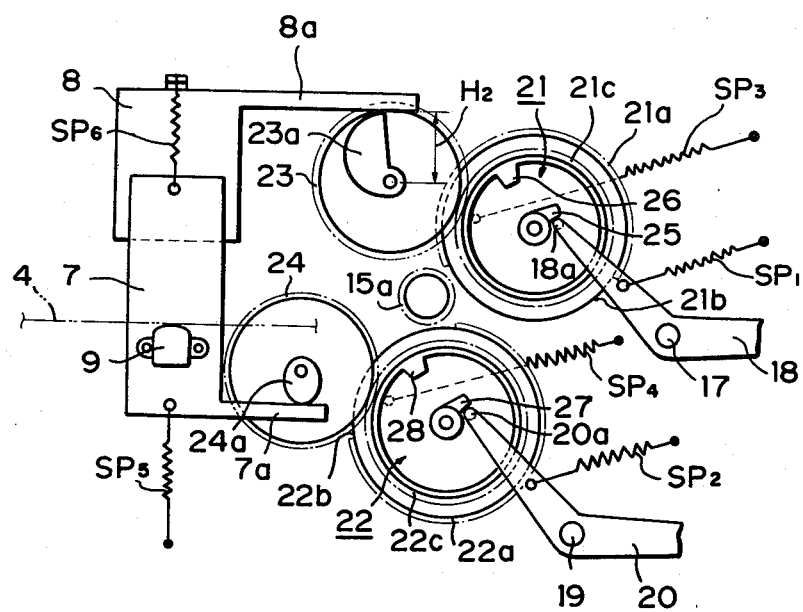

In order to effect the tape transport for the cue or review operations in the "play" position shown in FIG. 5b, the plunger 16b is actuated by "cue" or "review" function selector signal to turn the FR trigger lever 20 counterclockwise about the pivotal point 19, disengaging the fore end 20a of the FR trigger lever 20 from the stopper 28 of the FR trigger gear unit 22. Whereupon, the FR trigger gear unit 22 is quickly turned clockwise by the spring $SP_4$ and meshed with the capstan gear 15a. The FR trigger gear unit 22 and the FR cam gear 24 are thus rotated simultaneously by the rotational force of the flywheel 14. As soon as the capstan gear 15a is disengaged from the first FR trigger gear 22a at the void portion 22b, the FR trigger gear unit 22 is quickly turned by the spring $SP_4$ until the fore end 20a of the FR trigger lever 20 is abutted against the cam 27 of the FR trigger gear unit 22. In the meantime, the cam 24a of the FR cam gear 24 which has been rotated with the second FR trigger gear 22c is abutted against the riser wall 7a which is formed on the head base 7 as shown in FIG. 5c, pushing the head base 7 downwardly as seen in that figure. Therefore, the pressures which are imposed on the cassette tape 4 by he magnetic head 9 and the pinch roller (not shown) are weakened to permit "cue" and "review" as well as "pause" actions during the play operation without damaging the tape.

In the "play" state, the head base damp plate 8 is pushed up in the upper position by the cam 23a of the FD cam gear 23 and the head base 7 is held in the upper position by the spring $SP_6$ against the action of the spring $SP_5$, maintaining the tape recorder in "play" position. Consequently, there is no possibility of the head base damp plate 8 being returned by the cue and review actions, but the head base 7 being lowered independently against the action of the spring $SP_6$. In other words, in "cue" or "review" state, the relative displacement between the head base 7 and the head base dump plate 8 is absorbed by the spring $SP_6$.

In order to restore the play function from the cue and review actions in the play position, the plunger 16b is de-actuated to release the FR trigger lever 20 of the plunger force. As a result, the FR trigger lever 20 is turned clockwise by the spring $SP_2$ to have its fore end 20a disengaged from the cam 27 of the FR trigger gear unit 22. Whereupon, the FR trigger gear unit 22 is quickly turned by the spring $SP_4$ until the stopper 28 is abutted against the fore end 20a of the FR trigger lever 20. Consequently, the FR cam gear which is meshed with the FR trigger gear unit 22 is also turned and its cam 24a is disengaged from the riser wall 7a of the head base 7, pulling the head base 7 with the magnetic head 9 upwardly by the spring $Sp_6$ to restore the play position.

Figure 7:
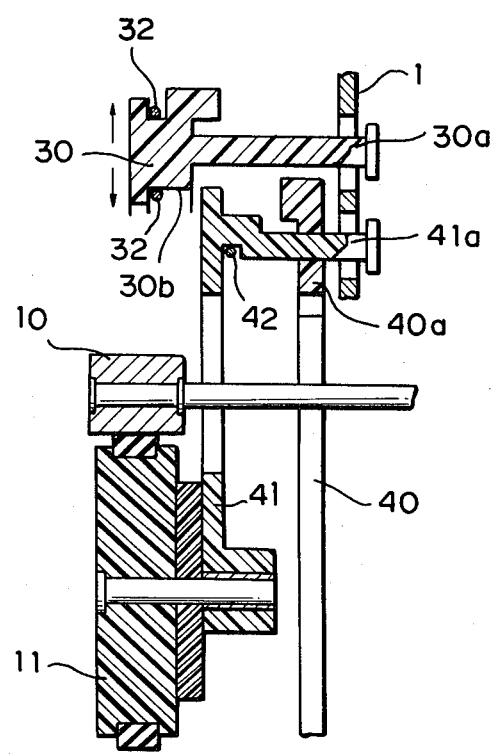
FIG. 7 is a sectional view taken along line X—X of FIG. 6.

In order to cancel the play position to resume the stop state, the plunger 16a is de-actuated through a function selector as mentioned hereinbefore in connection with FIG. 4d, disengaging the fore end 18a of the FD trigger lever 18 from the cam 25 of the FD trigger gear unit 21. Whereupon, the FD trigger gear 21 and FD cam gear 23 are turned by the springs $SP_3$ and $SP_5$ to disengage the cam 23a from the head base damp plate 8. Therefore, the head base 7 and head base damp plate 8 which is connected to the head base 7 with the spring $Sp_6$ are pulled down by the springs $SP_5$ and stopped in the lower position. FIGS. 6 and 7 illustrate in elevation and sectional views the operations performed by the mechanism according to the present invention. Initially, neither the middle pawl 40c nor the lower pawl 40b of the brake releasing plate 40 is in engagement with the cam 23b or 24b, so that the brake arm 30 is held in a lower position by the biasing force of the return spring 32, with a fork of the brake arm 30 held in engagement with the upper pawl 40a as indicated in phantom. Therefore, as indicated in phantom, the brake arm 30 has its brake pads 31a and 31b abutted against the respective reel stands 5 and 6 to hold the latter stationary, pushing down at the fork 30b. The idler support plate 41 which is supported by a weaker spring 42 as compared with the return spring 32. The idler 11 is thus held in free state, disengaged from the drive motor pulley 10a as indicated in phantom. The brake arm 30, idler 11 and brake releasing plate 40 are in the positions indicated in phantom when braking forces are applied on the respective reel stands. The brake is applied each time when changing the mode of operation from one function to another.

Under these circumstances, if either the cam 23b of the FD cam gear 23 or the cam 24b of the FR cam gear 24 comes into engagement with the middle pawl 40c or lower pawl 40b, the brake releasing plate 40 is pushed up to release the brake. More particularly, in the course of attaining the play position from the reset state, the FD cam gear 23 is turned counterclockwise, rotating therewith the cam 23b into engagement with the middle pawl 40c of the brake releasing plate 40. As a result, the brake releasing plate 40 is pushed up into the position shown in solid line, pushing up the brake arm 30. The idler support plate 41 is rleased from the return spring 32 and moved upward by the press spring 42 to press the idler 11 against the drive motor pulley 10 as shown in solid line. The reel stands 5 and 6 are now in free state, released from the brake pads 31a and 31b, respectively.

On the other hand, the drive motor pulley 10 is rotated counterclockwise or clockwise according to a received function selector signal (play, fast-forward, rewind or the like), rocking the idler 11 as shown in broken line into pressed engagement with either the feed reel stand 5 or take-up reel stand 6 to transmit the rotational driving force to the latter. Since relative positions are determined such that, at the time of "cue" and "review" operations in the play position, the cam 24b engages with the lower pawl 40b of the brake releasing plate 40 just when the cam 24a of the FR cam gear 24 pushes down the head base 7 by abutting engagement with the riser wall 7a of the latter, the brake releasing plate 40 is moved upward after the brake is once applied, pushing up the brake arm 30 to transmit the rotation of the motor drive pulley 10 to either the feed reel stand 5 or take-up reel stand 6 through the idler 11 in the same manner as described hereinbefore.

As clear from the foregoing description, the tape recorder of the present invention is provided with a tape drive mechanism of a simplified construction which is suitably divided to perform the "play", "fast-forward", "rewind", "cue" and "review" operations according to selected modes of operation, precluding delay of actions by a trigger mechanism with an improved operational response. In addition, the invention permits a reduction in the number and cost of the component parts of the trigger mechanism as compared with the conventional counterparts. More particularly, in order to shift the drive mechanism smoothly to the reset, play and stop positions, the trigger mechanism employs an FD trigger gear and an FD cam gear which are driven by the capstan gear, actuating the FD trigger gear and FD cam gear through an FD trigger lever which is operated manually or by a plunger operating on function selector signals. Further, the trigger mechanism employs, for smooth cue and review operations, an FR trigger gear and an FR cam gear which are driven by the capstan gear, actuating the FR trigger gear and FR cam gear through an FR trigger lever which is operated manually or by a plunger operating on function selector signals. Thus, the tape drive mechanism can be operated in a facilitated and reliable manner. Besides, each time upon stopping the function of play, fast-forward, or rewind, the braking mechanism which prevents slackening of the tape applies brakes simultaneously on the feed and take-up reels by unlocking a brake releasing plate which is driven by a cam in relation with the FR trigger gear and FR cam gear, ensuring smooth operations in the respective modes of the tape recorder. Furthermore, the brake arm which is operated in relation with the brake releasing plate can be mounted in position simply by fitting its leg in a slot formed in the chassis and holding its body by a return spring.

In the above-described drive mechanism for the feed and take-up reels, since the idler 11 is not constantly pressed against the feed and take-up reel stands, it is free of troubles such as deformation, abnormal wear or peeling-off of a friction ring of rubber fitted on the outer periphery of the idler and thus has a longer service life. The drive mechanism for the feed and take-up reels and the braking mechanism which is operated upon stopping each mode of operation are simultaneously put into or out of operating position by one motion of the brake releasing plate so that they can be operated easily and reliably and are less susceptible to operational errors.

I claim:
1. In a tape recording/reproducing apparatus having a magnetic head and means for receiving a magnetic tape, a tape drive mechanism comprising:

a rotatable capstan for transporting said tape at a predetermined linear speed;

a drive gear;

means for driving said capstan and said drive gear;

a first rotatable switch gear engageable with said drive gear for switching said tape drive mechanism into a position for at least a first mode of operation;

means for converting rotation of said first switch gear into a displacement of said magnetic head;

means for disengaging said drive gear and said switch gear in said first mode position of operation, said drive gear only being engaged with said first switch gear when the operation is switched to said first mode to shift said magnetic head relative to said tape to a position corresponding to said first mode of operation;

means for retaining said first switch gear in position for said first mode of operation;

a second rotatable switch gear engageable with said drive gear for switching said tape drive mechanism into a position for at least a second mode of operation other than the first mode;

means for converting the rotation of said second switch gear into a displacement of said magnetic head;

means for disengaging said drive gear and said second switch gear in said second mode position of operation, said drive gear only being engaged with said second switch gear when the operation is switched to said second mode to shift said magnetic head relative to said tape to a position corresponding to said second mode of operation; and means for retaining said second switch gear in position for said second mode of operation.

2. The tape recording/reproducing apparatus of claim 1, comprising:

means for releasing the retained disengaged first switch gear from the position for said first mode of operation;

means for driving the released disengaged first switch gear to switch said tape drive mechanism into a position for at least a third mode of operation; and means for retaining said first switch gear in a disengaged position for said third mode of operation.

3. The tape recording/reproducing apparatus of claim 2, comprising:

means for releasing the retained disengaged first switch gear from the position for said third mode of operation to permit said first switch gear to engage said drive gear to switch said tape drive mechanism into the position for said first mode of operation.

4. The tape recording/reproducing apparatus of claim 1, comprising:
means for releasing the retained disengaged second switch gear from the position for said second mode of operation;
means for driving the released disengaged second switch gear to switch said tape drive mechanism into the position for said first mode of operation; and
means for retaining said second switch gear in a disengaged position for said first mode of operation.

5. The tape recording/reproducing apparatus of claim 2, comprising:
means for releasing the retained disengaged second switch gear from the position for said first mode of operation to permit said first switch gear to engage said drive gear to switch said tape drive mechanism into the position for said second mode of operation.

6. The tape recording/reproducing apparatus of claim 1, wherein said drive gear is provided integrally with said capstan.

7. The tape recording/reproducing apparatus of claim 6 comprising a rotatable flywheel integral with said drive gear and said capstan, said flywheel being driven by said means for driving said capstan and said drive gear such that the inertia of rotation of said flywheel is utilized for changing positions of said tape drive mechanism for said respective modes of operation.

8. The tape recording/reproducing apparatus of claim 1, wherein said means for driving said capstan and said drive gear comprises an electric motor.

9. The tape recording/reproducing apparatus of claim 1, wherein said means for disengaging said drive gear and said first switch gear in said first mode of operation comprises a toothless portion provided on said first switch gear for interrupting the meshing between said first switch gear and said drive gear.

10. The tape recording/reproducing apparatus of claim 1, wherein said means for retaining said first switch gear in a position for said first mode of operation comprises a stopper provided on said first switch gear, and a disengagable lever engaging said stopper to prevent rotation of said first switch gear.

11. The tape recording/reproducing apparatus of claim 1, wherein said means for converting the rotation of said first switch gear into a displacement of said magnetic head comprises:
a cam gear rotating in synchronism with said first switch gear;
a cam provided on said cam gear; and
a cam follower engageable with said cam, said magnetic head being movable with said cam follower.

12. The tape recording/reproducing apparatus of claim 1, wherein said means for disengaging said drive gear and said second switch gear in said second mode of operation comprises a toothless portion provided on said second switch gear for interrupting the meshing between said second switch gear and said drive gear.

13. The tape recording/reproducing apparatus of claim 1, wherein said means for retaining said second switch gear in a position for said second mode of operation comprises a stopper provided on said second switch gear, and a disengageable lever engaging said stopper to prevent rotation of said second switch gear.

14. The tape recording/reproducing apparatus of claim 1, wherein said means for converting the rotation of said second switch gear into a displacement of said magnetic head comprises:
a cam gear rotating in synchronism with said second switch gear;
a cam provided on said cam gear; and
a cam follower engageable with said cam, said magnetic head being movable with said cam follower.

15. A cassette tape recorder of the type which has a magnetic tape head and utilizes rotational force of a motor-driven flywheel for shifting a tape drive mechanism into desired modes of operation, comprising:
a driven capstan gear provided coaxially with said motor-driven flywheel;
first and second partly toothless trigger gears respectively engageable with said capstan gear;
first and second fully toothed trigger gears fixedly and coaxially mounted on said first and second partly toothless trigger gears, respectively, to form respective first and second trigger gear units;
spring means rotatingly biasing said first and second trigger gear units in one direction upon disengagement of said first and second toothless trigger gears from said capstan gear at said toothless portions thereof;
first and second cam gears respectively engaging said first and second fully toothed trigger gears;
a first cam means communicating with said first cam gear for causing a magnetic head to abut against a cassette tape;
a second cam means communicating with said second cam gear for lessening the contacting pressure of said magnetic head against said cassette tape;
first and second trigger levers; and
stoppers provided on said first and second trigger gear units, said stoppers being respectively engageable with fore ends of said first and second trigger levers for respectively stopping said first and second cam gears upon rotation at said toothless portions of said first and second partly toothless trigger gears to selectively position said respective cam means to hold said magnetic head and cassette tape in the abutting or the reduced pressure positions.

16. The tape cassette recorder of claim 15 comprising plunger solenoids to operate said trigger levers.

17. The tape cassette recorder of claim 15 wherein said trigger levers are manually operated.

18. The cassette tape recorder of claim 15 comprising a magnetic head base damp plate, a head base on which said magnetic head is mounted and, means for transmitting movement of said head base damp plate to said head base, and wherein said cam means for causing said magnetic head to abut against said magnetic tape includes a cam engageable with said head base damp plate to cause movement of said head base to a position of contact between said tape head and said tape.

19. A cassette tape recorder of the type which has a magnetic tape head and utilizes rotational force of a motor-driven flywheel for shifting a tape drive mechanism into desired modes of operation, comprising:
a driven capstan gear provided coaxially with said motor-driven flywheel;
first and second partly toothless trigger gears respectively engageable with said capstan gear;
biasing springs connected to and adapted to rotate said first and second partly toothless trigger gears in one direction upon disengagement of said first and second partly toothless trigger gears from said capstan gear at the toothless portions thereof;

first and second fully toothed trigger gears coaxially mounted on said first and second partly toothless trigger gears, respectively, to form respective first and second trigger gear units;

first and second cam gears respectively engaging said first and second fully toothed trigger gears;

tape feed and tape take-up reel stands for cassette tape;

brake pads engageable abutting said stands;

a first cam means communicating with said first cam gear for moving said brake pads out of abutting engagement with said tape reel stands;

a second cam means communicating with said second cam gear for alternatively moving said brake pads out of abutting engagement with said tape reel stands;

first and second trigger levers; and stoppers provided on said first and second trigger levers, said stoppers being respectively engageable with the fore ends of said first and second trigger levers for respectively stopping said first and second cam gears upon rotation at said toothless portions of said first and second partly toothless trigger gears to selectively position said respective cam means to hold said brake pads in positions in or out of abutting engagement with said tape feed and tape take-up reel stands.

20. The cassette tape recorder of claim 19, comprising:

a bifurcated brake arm with said brake pads being attached to the fore ends thereof;

resilient means for forcing said brake arm to press said brake pads against said feed and take-up reel stands;

a brake releasing plate supporting said brake arm, said brake releasing plate being movable by alternative engagement with said first and second cam means to release said break pads from said reel stands;

a reversibly rotatable drive motor pulley;

a rocking idler support plate pivotally supported on said break releasing plate; and an idler journalled in said rocking idler support plate, said idler support plate being simultaneously movable with said brake plate to press said idler against said drive motor pulley to impart the forward or reverse rotation of said drive motor pulley to said idler, said rotating drive motor pulley causing said rocking idler support plate to pivot and move said idler into pressed engagement with said feed or take-up reel stands to impart rotational movement thereto.

* * * * *